United States Patent [19]

Andre

[11] Patent Number: 4,682,298
[45] Date of Patent: Jul. 21, 1987

[54] SYSTEM FOR DERIVING A MEASURING SIGNAL IN A HEATING SYSTEM

[75] Inventor: Wolfram K. Andre, Aichwald, Fed. Rep. of Germany

[73] Assignee: Kurt Wolf & Co. KG, Fed. Rep. of Germany

[21] Appl. No.: 662,093

[22] Filed: Oct. 18, 1984

[30] Foreign Application Priority Data

Oct. 26, 1983 [DE] Fed. Rep. of Germany ....... 3338788

[51] Int. Cl.$^4$ .......................... H05B 1/02; A47J 27/62
[52] U.S. Cl. .................................... 364/557; 219/492; 219/497; 364/575
[58] Field of Search ........................ 364/557, 575, 734; 219/492, 497; 340/589

[56] References Cited

U.S. PATENT DOCUMENTS

| 4,031,365 | 6/1977 | Raggiotti et al. | 364/557 |
| 4,368,433 | 1/1983 | Imazeki et al. | 328/30 |
| 4,379,964 | 4/1983 | Kanazawa et al. | 219/492 |
| 4,437,159 | 3/1984 | Waugh | 364/400 |
| 4,543,570 | 9/1985 | Bressert et al. | 340/589 |
| 4,551,601 | 11/1985 | Nishimura | 219/492 |
| 4,601,004 | 7/1986 | Holt et al. | 364/557 |

*Primary Examiner*—Errol A. Krass
*Assistant Examiner*—Daniel W. Juffernbruch
*Attorney, Agent, or Firm*—Thomas W. Speckman; Ann W. Speckman

[57] ABSTRACT

The invention relates to a process for deriving a measuring signal proportional to the temperature rise of a temperature-time characteristic curve in a heating system having a cooker with cooking material on a heating plate, in which the temperature of the cooker is measured by means of a temperature sensor. The system operates accurately, even during brief temperature oscillations, and using relatively great temperature increments for digitalization of the measuring value signal, when the analogous measuring value signal emitted by the temperature measuring sensor is periodically converted into corresponding digital signals, the digital signals are cyclically fed into memory points of a cyclically-operating memory with n memory points, after each cycle of the memory, a temperature average is calculated from the digital signals stored in the first k and the last k memory points of the memory, wherein k is less than n/2, a measuring signal which corresponds to the temperature difference arising during the preceding cycle is generated from both temperature averages; and after every cycle, all memory points of the memory are cleared and subsequently derived digital signals are fed to the memory.

15 Claims, 2 Drawing Figures

SYSTEM FOR DERIVING A MEASURING SIGNAL IN A HEATING SYSTEM

BACKGROUND OF THE INVENTION

This invention relates to a process for deriving a measuring signal dependent on the temperature rise of a temperature-time characteristic curve of a heating system comprising a cooker with cooking materials on a heating plate, and in which, by means of a temperature sensor, the temperature in or on the cooker is measured.

In such a heating system, the measuring signal may be converted into a control signal and used to regulate the thermal output of the heater, since thermal output must be increased or reduced according to the temperature change, considering various time constants of the heating system, to avoid exceeding the desired temperature after reaching the cooking temperature, which can then be held constant by means of a regulating circuit.

The analogous determination and evaluation of the temperature rise requires complex switching circuits. If the evaluation is computed digitally, then, because of the turbulent disturbances arising during the final phase of the heating process, brief temperature oscillations occur, which can lead to considerable inaccuracies in measurement, which may be further increased, if the digitally determined temperature increments, based on a lesser circuit complexity, are relatively great. These temperature oscillations which are caused by turbulent disturbances in the cooker appear especially when the temperature at which the steam phase begins, that is, around 90° C., is reached in the cooker.

Since the transition from this temperature to the regulated cooking temperature is very strongly dependent on the quantity of cooking material in the cooker, it is especially important to precisely determine the temperature rise during the final phase of the heating process.

SUMMARY OF THE INVENTION

One object of this invention is to create a process of the type described above, which measures the average temperature rise with accuracy to produce the measuring signal with relatively moderate circuit complexity, even during great temperature changes and during brief temperature oscillations.

This object is achieved in accordance with this invention as follows: the analogous measuring value signal which is emitted by the temperature sensor is periodically converted into corresponding digital signals, the digital signals are cyclically fed into the memory points of a cyclically operating memory with a number n memory points comprising one cycle. After each cycle of the memory, a temperature average is derived from the digital signals stored in the first number k and the last number k memory points of the memory, wherein k is less than n/2, a measuring signal which corresponds to the temperature difference exhibited during the preceding cycle is emitted, and after every cycle, all memory points of the memory are cleared, and subsequently derived digital signals are fed to the memory.

In this process, temperature measurement takes place periodically and at brief intervals, so that a multiplicity of digital signals derived from it are stored. The number of stored digital signals depends on the number of memory points in the cyclical memory. The cycle of the memory thus comprises the number of scanning cycles of the analogous measuring value signals. To eliminate inaccuracies caused by the relatively great temperature changes occurring while the measuring value signal is converted into the digital signal, and by brief temperature oscillations which can often exceed the temperature change, several digital signals are averaged at the beginning and the end of the cycle, and a measuring signal is derived from the averaged values, which corresponds to the temperature difference which arises during the cycle. This process is repeated after every cycle, so that, after the measuring signal has been derived, all memory points of the memory are cleared to receive newly derived digital signals. A simple analog to digital converter with a small number of bits can thus be used to convert the analogous measuring value signal.

It may be provided, according to one embodiment, that the measuring signal indicates, in digital form, the temperature rise during the preceding cycle in increments of preset temperature units. The measuring signal is thus dependent on the temperature difference which arises during the cycle.

In order to use the measuring signal to directly regulate thermal output, it is provided, in accordance with a further embodiment, that the measuring signal is stored over the following cycle. It thus differs only at the end of the cycle.

The measuring signal is derived in accordance with another embodiment in the following manner: at the end of the cycle, the digital signals of the first number k and of the last number k memory points of the memory are transmitted to an average value switching circuit, in which the k digital signals are added, then divided by k, and the digital output signals of these average value switching circuits which correspond to the temperature averages are conveyed to a differential circuit, which calculates the difference between the transmitted digital output signals, and emits a corresponding digital control signal. All switching circuits can be combined in an integrated structural element.

Since at the beginning of the heating process, heating is always carried out with full thermal output, to simplify the system, it is provided that conversion of the analogous measuring value signals emitted by the temperature sensor to digital signals is initiated at a minimum temperature. An analog to digital converter is used, which first converts the analogous measuring value signals from a preset analogous value. For the analog to digital conversion, a significantly smaller temperature range needs to be included. This leads to greater resolution for a given bit number of the analog to digital converter, that is, to smaller temperature changes. For given temperature changes, a less expensive analog to digital converter can be employed, which consequently has less complex memory and control.

To convert the analogous measuring value signals into digital signals and to store the digital signals in the cyclical memory, control is exercised in accordance with another development, by means of a synchronizing signal generator, which offers serial transmission of the digital signals.

For the time constants of the heating systems mentioned above, a system has proved adequate in which the analogous measuring value signal is converted approximately every second, a memory with approximately $n=20$ to $n=30$ memory points is used, and the temperature averages are derived using stored digital signals from about $k=3$ to $k=5$ memory points.

BRIEF DESCRIPTION OF THE DRAWING

The invention is best understood by reference to the drawings in which.

DESCRIPTION OF PREFERRED EMBODIMENTS

Figure 1:
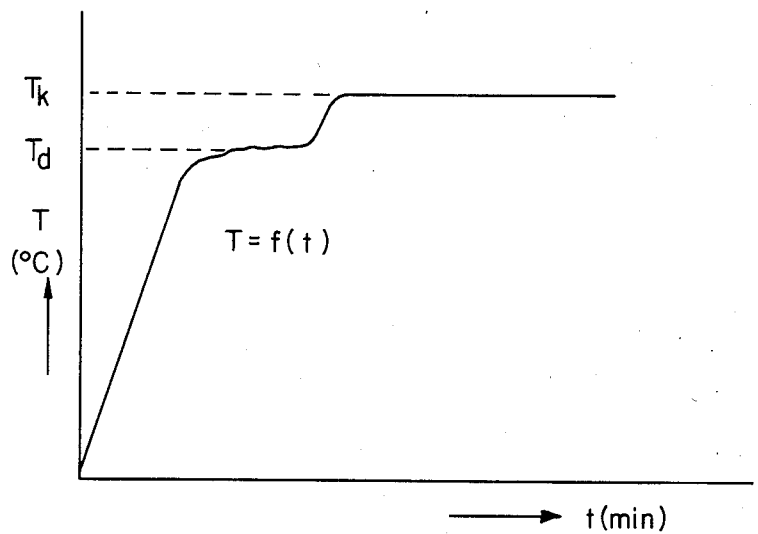
FIG. 1 depicts a typical temperature-time characteristic curve T=f(t) of a heating system comprising a cooker with cooking material on a heating plate.

As can be seen from the temperature-time characteristic curve T=f(t) of FIG. 1, the temperature in the above mentioned type of heating system first rises during the heating phase, roughly in proportion to the time. The rise is, however, variable, and depends on the type and quantity of cooking material in the cooker. If, within this range of the temperature-time characteristic curve T=f(t), the temperature rise is determined, a control signal indicates the type and quantity of cooking material in the cooker.

When the temperature reaches a value of Td=90° C., the steam phase begins. The temperature increase decelerates, before it again accelerates more sharply to reach the cooking temperature Tk. In a steam pressure cooker, this flat part of the temperature-time characteristic curve T=f(t) is dependent on the quantity of solid cooking material positioned above the water bath. Within this range, small temperature oscillations occur due to turbulent disturbances in the cooker, which lead to a distortion of the measuring results, and which can result in a false measuring signal, especially if these temperature oscillations extend over temperature ranges which are equal to or greater than the temperature increments provided for by the digitalization of the analogous measuring value signal.

Figure 2:
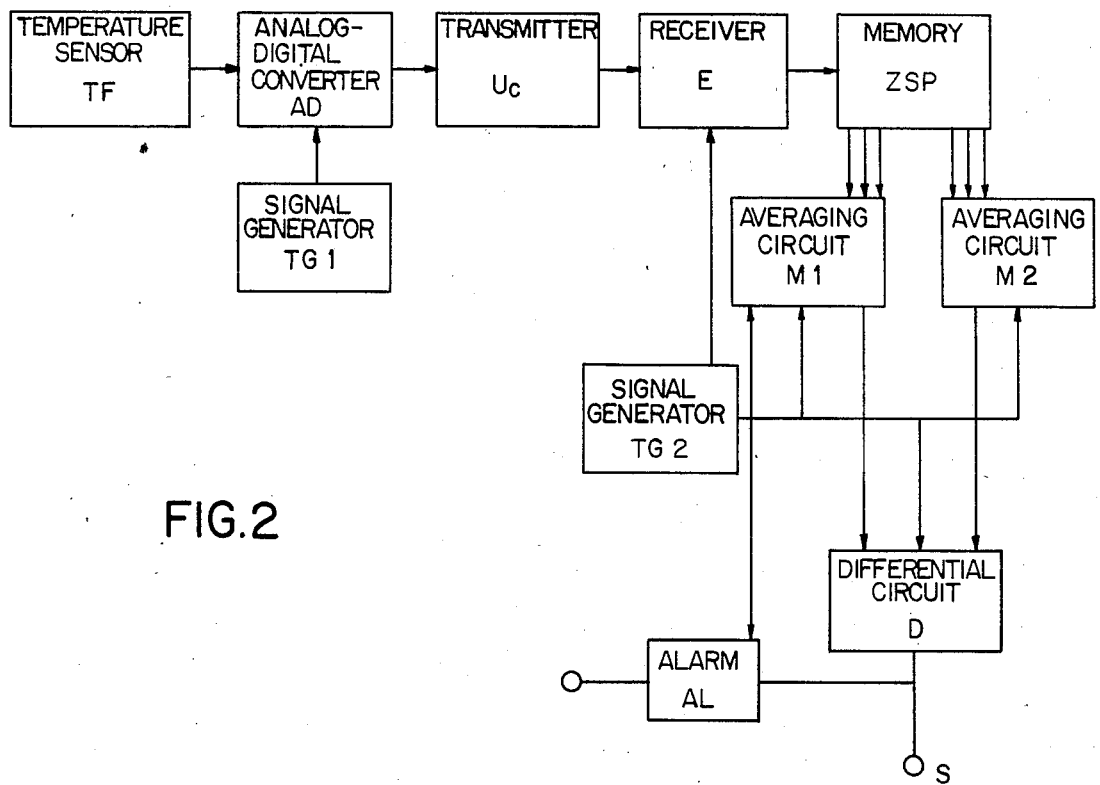
FIG. 2 depicts a schematic wiring diagram of a system for deriving a measuring signal dependent on the temperature rise of the temperature-time characteristic curve in accordance with FIG. 1.

A schematic wiring diagram for such a system is shown in FIG. 2, wherein the derived measuring signal s reproduces with sufficient accuracy the temperature rise of the temperaturetime characteristic curve T=f(t) over a preset time span, even if relatively great temperature increments are used for digitalization and even during temperature oscillations.

The temperature of the cooker is determined by temperature sensor TF, which emits an analogous measuring value signal proportional to the temperature. Different devices can be used as temperature sensors, so long as they emit an analogous measuring value signal proportional to the temperature. By means of analog to digital converter AD, and with the aid of synchronizing signal generator TG1, the analogous measured value is converted into a corresponding digital signal at preset time intervals, for example, of 1 second. The analog to digital converter is designed so that it can determine the temperature within preset temperature increments, for example, 0.5° C., and can reproduce these measurements in corresponding digital signals. It may also be provided, for simplification, that in the heating phase, up to a preset temperature of, for example, 40° C., no digital signal is produced by analog to digital converter AD; that is, the zero point of the analog to digital converter may be set at, for example, 40° C. Thus, the residual temperature range can be determined using smaller temperature increments by means of a preset zero value threshold of the analog to digital converter AD, which then increases the accuracy of measurements.

Utilizing a temperature increment of, for example, 0.5° C., the complexity, or the number of bits, of analog to digital converter AD, can be reduced. Digital signals are transmitted along transmission distance by transmission carrier Ue, which may be variously formed. Receiver E detects the digital signal transmitted, and, with the aid of synchronizing signal generator TG2, these signals are fed into cyclical memory ZSP. Memory ZSP has, for example, n=24 memory points, so that the cycle duration amounts, for example, to n=24 memory points. After 24 seconds, digital signals have been fed into all of the n=24 memory points. At the end of the cycle, a temperature average is calculated from the first k=3 to 5 memory points and from the last k=3 to 5 memory points. Digital signals may be transmitted to average switching circuits M1 and M2, added, and then divided by the factor k. In this manner, averaged digital signals, which represent a temperature average of k digital signals, arise at the outlets of average switching circuits M1 and M2. Minor irregularities, resulting from the preset temperature increments during analog to digital conversion, and brief temperature oscillations, are thereby eliminated. Both of the averaged digital signals at the outputs of average-switching circuits M1 and M2 are conducted to differential circuit D, which calculates the difference between them, and emits digital measuring signal s, which indicates the temperature change, when the temperature has either increased or decreased from the beginning to the end of the preceding cycle, so that it can be used, for example, as a regulating signal for heating. All digital signals are afterwards cleared from the memory points of memory ZSP, and the newly derived digital signals are fed into memory ZSP to initiate a new measuring process.

Measuring signal s, which digitally indicates by the number of preset temperature increments, the temperature change which has occurred during the preceding cycle, may, with the aid of a function stored in a program memory, also be converted into a control signal for the heating control circuit. Depending on the size of measuring signals s, a control signal may be derived from them which directly controls the time for heating in the following cycle.

If it is determined after a cycle that a memory point of the memory has not stored a digital signal, then derivation of the measuring signal may be cancelled, and the measuring signal s of the preceding cycle remains operative. The number of defective cycles may be monitored by alarm unit AL, and, after a preset number, a disturbance signal may be activated by alarm unit AL to switch off the heating element.

I claim:

1. A process for deriving a measuring signal dependent on the temperature rise of a temperature-time characteristic curve in a heating system comprising a cooker with cooking materials on a heating plate wherein the temperature of said cooker is measured by means of a temperature sensor and an analogous measuring signal is emitted by said temperature sensor (TF), said process comprising: periodically converting said analogous measuring signal into corresponding digital signals; cyclically feeding said digital signals into a plurality of memory points of a cyclically-functioning memory (ZSP) with "n" memory points wherein the cyclical feeding of one of said digital signals through all "n" of said "n" memory points defines a cycle; deriving a first and a second temperature average from said digital signals after each said cycle of "n" memory points using a first k and a last k memory points of said memory (ZSP), where said first temperature average is derived from said first K memory points and said second temperature average is derived from said last K memory points, where k is less than n/2 and k is greater than one, and deriving a difference between said first and second temperature averages; deriving said measuring signal (s) after completion of each said cycle from said difference between said first and second temperature averages; and after completion of each said cycle, clearing all said memory points of said memory (ZSP) and repeating said cycle.

2. The process of claim 1 additionally comprising providing said measuring signal (s) in digital form indicating a temperature change during said preceding cycle in preset increments of temperature units.

3. The process of claim 2 additionally comprising storing said measuring signal (s) during a subsequent said cycle.

4. The process of claim 3 additionally comprising conveying said digital signals corresponding to said first k and said last k memory points of said memory (ZSP) to first and second averaging circuits Ml, M2, respectively, at the end of each said cycle, said first averaging circuit adding the contents of said first k memory points, and said second averaging circuit adding the contents of said last K memory points, and dividing the value in each of said first and second averaging circuits, Ml, M2, respectively, by k to derive said first and second temperature averages; conveying a digital output signal of each said averaging circuit corresponding to said first and second temperature averages to a differential circuit D; and deriving the difference between said digital output signals at said differential circuit D, said differential circuit D producing said measuring signal (s) corresponding to said difference.

5. The process of claim 4 additionally comprising initiating conversion of said analogous measuring signals emitted by said temperature sensor TF into said digital signals at a preset threshold temperature.

6. The process of claim 4 additionally comprising controlling said conversion of said analogous measuring signals into said corresponding digital signals and controlling said cyclical feeding of said digital signals into said memory (ZSP) by at least one synchronizing signal generator TG1, TG2.

7. The process of claim 6 additionally comprising converting said analogous measuring signal to said corresponding digital signal approximately every second; feeding said digital signals into approximately n=20 to n=30 memory points in said memory; and deriving said temperature averages using approximately k=3 to k=5 memory points.

8. The process of claim 7 additionally comprising deriving a control signal for a heating control circuit from said measuring signal according to a preset program, said control signal controlling the heating during the following said cycle.

9. The process of claim 2 wherein said preset increments of temperature units are from about 0.5 to 1.0° C.

10. The process of claim 1 additionally comprising storing said measuring signal during the following said cycle.

11. The process of claim 1 additionally comprising conveying said digital signals corresponding to said first k and said last k memory points of said memory (ZSP) to first and second averaging circuits Ml, M2, respectively, said first averaging circuit adding the contents of said first k memory points and said second averaging circuit adding the contents of said last k memory points at the end of each cycle, and then dividing the value in each of said first and second averaging circuits, M1, M2, respectively, by k to derive said first and second temperature averages; conveying a digital output signal of each said averaging circuit corresponding to said two temperature averages to a differential circuit D; and deriving a difference between said digital output signals at said differential circuit D, said differential circuit D producing said measuring signal corresponding to said difference.

12. The process of claim 1 additionally comprising initiating conversion of said analogous measuring signals emitted by said temperature sensor TF into said digital signals at a preset threshold temperature.

13. The process of claim 1 additionally comprising controlling said conversion of said analogous measuring signals into said corresponding digital signals and controlling said cyclical feeding of said digital signals into said memory (ZSP) by at least one synchronizing signal generator TG1, TG2.

14. The process of claim 1 additionally comprising converting said analogous measuring signal to said corresponding digital signal approximately every second; feeding said digital signals into approximately n=20 to n=30 memory points in said memory; and deriving said temperature averages using approximately k=3 to k=5 memory points.

15. The process of claim 1 additionally comprising deriving a control signal for a heating control circuit from said measuring signal (s) according to a preset program, said control signal controlling the heating during the following said cycle.

* * * * *